(12) United States Patent
Vourc'h et al.

(10) Patent No.: US 8,781,774 B2
(45) Date of Patent: Jul. 15, 2014

(54) INTEGRATED CLOSED-LOOP HYBRIDIZATION DEVICE BUILT IN BY CONSTRUCTION

(75) Inventors: Sébastien Vourc'h, Paris (FR); Stanislas Szelewa, Paris (FR); Thibault Lartigue, Paris (FR)

(73) Assignee: Sagem Defense Securite, Paris (FR)

( * ) Notice: Subject to any disclaimer, the term of this patent is extended or adjusted under 35 U.S.C. 154(b) by 425 days.

(21) Appl. No.: 13/140,016

(22) PCT Filed: Dec. 16, 2009

(86) PCT No.: PCT/EP2009/067338
§ 371 (c)(1),
(2), (4) Date: Sep. 16, 2011

(87) PCT Pub. No.: WO2010/070012
PCT Pub. Date: Jun. 24, 2010

(65) Prior Publication Data
US 2011/0320152 A1     Dec. 29, 2011

(30) Foreign Application Priority Data

Dec. 17, 2008   (FR) ...................................... 08 58721

(51) Int. Cl.
*G01C 17/38*     (2006.01)
(52) U.S. Cl.
USPC .......................................................... 702/92
(58) Field of Classification Search
USPC .......................................................... 702/92
See application file for complete search history.

(56) References Cited

U.S. PATENT DOCUMENTS

| 5,701,259 | A | * | 12/1997 | Dittrich | 702/92 |
| 5,835,891 | A | * | 11/1998 | Stoneking | 702/117 |
| 6,609,037 | B1 | * | 8/2003 | Bless et al. | 700/45 |
| 2007/0016371 | A1 | * | 1/2007 | Waid et al. | 701/213 |
| 2007/0189538 | A1 | * | 8/2007 | Lindteigen | 380/274 |
| 2007/0242828 | A1 | * | 10/2007 | Lindteigen | 380/255 |
| 2007/0265810 | A1 | * | 11/2007 | Martin et al. | 702/190 |
| 2008/0306689 | A1 | * | 12/2008 | Kourogi et al. | 701/217 |
| 2009/0096670 | A1 | * | 4/2009 | Mizuochi et al. | 342/357.12 |
| 2010/0027667 | A1 | * | 2/2010 | Samuelsson et al. | 375/240.16 |
| 2010/0073378 | A1 | * | 3/2010 | Abe et al. | 345/441 |

FOREIGN PATENT DOCUMENTS

| EP | 1 801 539 | 6/2007 |
| FR | 2 866 423 | 8/2005 |
| WO | WO 2008/040658 | 4/2008 |

* cited by examiner

*Primary Examiner* — Sujoy Kundu
*Assistant Examiner* — Alvaro Fortich
(74) *Attorney, Agent, or Firm* — Blakely Sokoloff Taylor & Zafman

(57) ABSTRACT

The invention relates according to a first aspect to a hybridization device (1) comprising a virtual platform (2), a bank (3) of Kalman filters each estimating a correction vector (dX0-dXn) comprising a plurality of components, said device formulating a hybrid output (SH) corresponding to inertial measurements (PPVI) calculated by the virtual platform (2) and corrected by a stabilization vector (dC) exhibiting one and the same plurality of components, characterized in that it comprises a correction formulation module (4) configured so as to formulate each of the components (dC[state]) of the stabilization vector (dC) as a function of all the corresponding components (dX0[state]-dXn[state]) of the correction vectors (dX0-dXn).

9 Claims, 1 Drawing Sheet

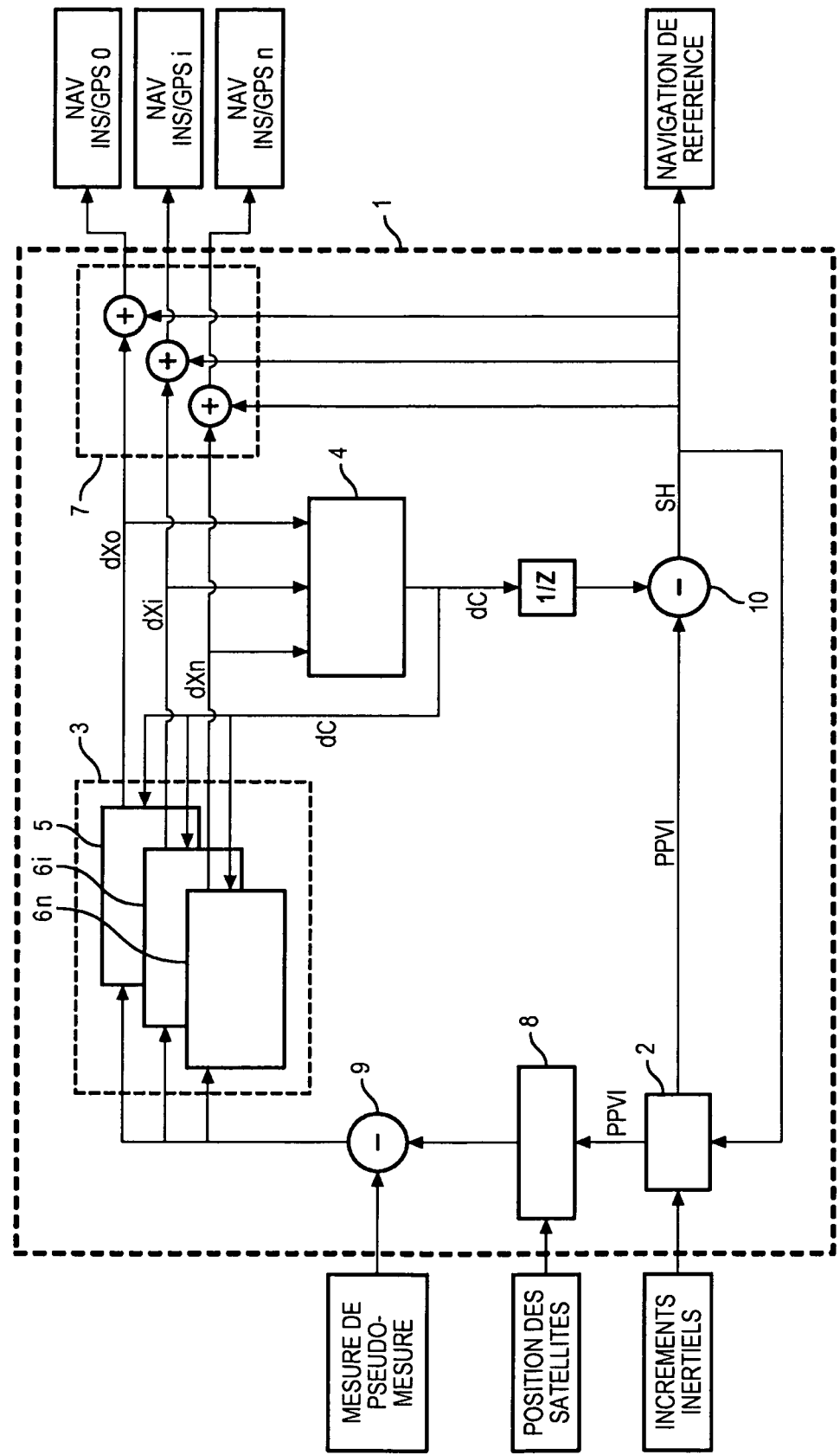

INTEGRATED CLOSED-LOOP HYBRIDIZATION DEVICE BUILT IN BY CONSTRUCTION

This is a non-provisional application claiming the benefit of International Application Number PCT/EP/2009/0637338 filed Dec. 16, 2009.

The field of the invention is that of carriers using information supplied both by an inertial unit and by a satellite navigation system, such as for example a GPS system.

The invention relates to a closed-loop hybridization device, and more particularly concerns the formulation of the command that has to be applied for the purposes of stabilisation to the inertial calculation device (virtual platform) of the inertial unit and to the inertial measurements that come from it.

Carriers such as aircraft or instead ships have numerous navigation systems. Among these systems may be included in particular INS/GNSS (which stands for "Inertial Navigation System" and "Global Navigation System") hybrid equipment.

An inertial unit supplies low noise and precise information in the short term. However, in the long term, the localisation performance of an inertial unit deteriorates (more or less quickly as a function of the quality of the sensors, accelerometers or gyroscopes for example, and the processing used by the unit). Although the information acquired from a satellite navigation system is for its part very unlikely to drift in the long term, it is however often noisy and of variable precision. Moreover, the inertial measurements are always available whereas the GPS information is not or is likely to be falsified and scrambled.

Hybridization consists in combining the information supplied by the inertial unit with the measurements supplied by the satellite navigation system so as to obtain position and speed information by taking advantage of both systems. Thus, the precision of the measurements supplied by the GNS receiver makes it possible to control the inertial drift and the low noise inertial measurements make it possible to filter the noise on the measurements of the GNSS receiver.

Modern navigation systems calculate protection rays around the calculated position, which makes it possible to contain the real position error to a given integrity risk, which is what defines the integrity of a system.

According to the prior art, these protection rays may be calculated by means of a bank of Kalman filters which makes it possible to protect against the onset of a simple fault.

These filters realise the hybridization between the information from the satellite navigation system and that from the inertial unit. One of the filters of the bank of filters, designated by the term main filter, uses all the GNSS measurements constituted of pseudo-measurements and information on the quality thereof. The other filters, known as secondary, of the bank of filters only make use of part of the available GNSS measurements. If a fault arises at the level of a satellite measurement, it will not be seen by the secondary filter not receiving said measurement: this secondary filter will thus remain non polluted.

The use of such a bank of Kalman filters within the scope of a closed-loop hybridization (in other words when it is wished to apply directly the corrections calculated by the Kalman filter to the virtual platform) has for example been proposed by the document EP1801539 A.

This document advantageously provides only integrating a single virtual platform, and implementing a satellite fault detection in order to select the Kalman filter, the output of which (correction vector hereafter) will be applied (as stabilization vector) to the virtual platform and to the inertial measurements that come from it.

Thus, this document provides selecting the main Kalman filter when no fault of one of the satellites is detected, or, when a fault is detected, selecting the secondary Kalman filter not affected by the fault. In so far as the corrections thus come from a single filter (the stabilization vector of the inertial measurements thus being a recopy of the correction vector estimated by the Kalman filter selected) and where this filter is not affected by a satellite fault, one does thus not apply to the inertial measurements erroneous corrections through propagation of information corrupted by a satellite fault.

Nevertheless, the architecture proposed in this document does not prove to be entirely satisfactory. Indeed, in so far as the corrections are from a single filter, if a fault is not detected, or if the faulty satellite is excluded, the virtual platform is going to be reset with a command (stabilization vector) polluted by this fault. In so far as this document moreover provides that the calculation of pseudo-measurements estimated a priori is realised from information delivered by the virtual platform, the pseudo-measurements used by all of the filters are then polluted.

This architecture thus does not intrinsically guarantee that one of the filters of the bank will not be polluted by the fault. Furthermore, the reconfiguration (recopying of the data from the non polluted filter onto the whole bank of filters) does not ensure The return to measurements not polluted by the fault because the excluded satellite is perhaps not the one that contains the fault.

The objective of the invention is to make up for these drawbacks and proposes to this end according to a first aspect a hybridization device comprising a virtual platform, a bank of Kalman filters each estimating a correction vector dX0-dXn, the device delivering a hybrid output corresponding to PPVI inertial measurements calculated by the virtual platform and corrected by a stabilization vector dC, characterised in that it comprises a module for formulating the correction configured so as to formulate each of the components dC[state] of the stabilization vector as a function of the set of corresponding components dX0[state]-dXn[state] of the correction vectors dX0-dXn.

Certain preferred, but non limiting, aspects of this device are as follows:
  the module for formulating the correction is configured, for each component of the stabilization vector, so as:
  to analyse the sign of the set of corresponding components of the correction vectors;
  when the set of said corresponding components are not of same sign, to formulate a component of zero value for the stabilization vector;
  when the set of said corresponding components are of same sign, to formulate a component of non zero value for the stabilization vector, determined as a function of the value of each of said components of the correction vectors.
  the non zero value of the component of the stabilization vector corresponds to the minimum of the set of corresponding components of the correction vectors when the set of said corresponding components are positive, and corresponds to the maximum of the set of corresponding components of the correction vectors when the set of said corresponding components are negative.
  the non zero value of the component of the stabilization vector corresponds to the average of the smallest p corresponding components of the correction vectors, taken in absolute value, and with p for example equal to 2.

the stabilization vector is applied at the input of the set of filters of the bank of filters;

the hybrid output is re-looped at the input of the virtual platform;

the bank of Kalman filters comprises a main Kalman filter receiving the signal measurements emitted by n satellites, and n secondary Kalman filters each receiving the signal measurements emitted by the N satellites with the exception of one satellite;

the device moreover comprises a bank of summers positioned at the output of the bank of filters to add to each correction vector the hybrid output.

According to a second aspect, the invention proposes a method of formulating a stabilization vector intended to correct inertial measurements calculated by a virtual platform of a hybridization device, characterised in that the stabilization vector is formulated component by component and in that each component dC[state] of the stabilization vector dC is formulated as a function of the set of corresponding components dX0[state]-dXn[state] of correction vectors (dX0-dXn) estimated by a bank of Kalman filters.

Other aspects, aims and advantages of the present invention will become clearer on reading the following detailed description of preferred embodiments thereof, given by way of non limiting example, and made in reference to the appended drawings in which FIG. 1 is a diagram illustrating a possible embodiment of a device according to the first aspect of the invention.

With reference to FIG. 1, a hybridization device 1 according to a possible embodiment of the first aspect of the invention is represented, intended to be fitted on board a carrier such as an aircraft. The hybridization device 1 uses information supplied by an inertial unit and by a satellite navigation system, and comprises a single virtual platform 2 and a bank 3 of Kalman filters.

The virtual platform 2 receives inertial increments from sensors (gyroscopes, accelerometers) of an inertial unit. The inertial increments correspond in particular to angular increments and speed increments. Inertial navigation information (such as the attitudes, the course, the speed or the position of the carrier) is calculated by the virtual platform on the basis of these increments. This inertial navigation information is designated PPVI inertial measurements hereafter.

The PPVI inertial measurements are transmitted to a device for calculating pseudo-distances estimated a priori 8 which also receives data on the position of the satellites. From on the one hand inertial measurements and on the other hand by data on the position of the satellites, the device for calculating pseudo-distances estimated a priori 8 calculates the pseudo-distances a priori between the carrier and the different satellites visible from the carrier.

The hybridization device 1 also receives from the satellite navigation system the pseudo-measurements between the carrier and the different visible satellites. It is then possible to calculate, via a subtractor 9, the deviations (known as observations) between the pseudo-measurements estimated a priori and the pseudo-measurements.

The hybridization device 1 further comprises a bank of extended Kalman filters 3 realising the hybridization between the inertial information coming from the inertial unit and the information from the satellite navigation system. Apart from a function of supply of statistical information on the measurements at the output, the role of the filters is to maintain the virtual platform 2 in a linear operating range, an image of that modeled in the Kalman filter by each estimating a correction vector dX0-dXn (state vector of the Kalman filter comprising, generally speaking, of the order of 30 components).

In a manner conventionally known in itself, the bank of filters 3 comprises several Kalman filters in parallel. One of the filters is known as main Kalman filter 5: it receives all of the observations. The other filters $6i$, $6n$ are known as secondary filters:

they only receive part of the observations, for example (n-1) observations among the n observations relative to the n visible satellites such that the i-th secondary Kalman filter $6i$ considers the pseudo-measurements of all the satellites except for the i-th.

It will be noticed that the process of formulation of the observations described above is not common to all of the filters of the bank 3, but is realised for each of the filters. Thus, as is represented in FIG. 1, a device for calculating pseudo-distances a priori 8 and a subtractor 9 are present for each filter of the bank.

The hybridization device 1 formulates a hybrid output SH ("reference Navigation") corresponding to the PPVI inertial measurements calculated by the virtual platform 2 and corrected by a stabilization vector dC having as many components as the correction vectors estimated by the Kalman filters.

In the document EP1801539 A discussed in the introduction, the corrections to apply to the inertial measurements are from a single filter. Thus, the stabilization vector is equal, in all of its components, to the correction vector estimated by the Kalman filter selected.

The invention adopts a different approach by formulating the stabilisation vector component by component, and by using for each component the set of Kalman filters. The device 1 according to the invention comprises to this end a module for formulating the correction 4 configured so as to formulate each of the components dC[state] of the stabilization vector dC as a function of the set of corresponding components dX0[state]-dXn[state] of the correction vectors dX0-dXn.

According to a possible embodiment of the invention, the module for formulating the correction 4 is configured, for each component dC[state] of the stabilization vector dC, so as:

to analyse the sign of the set of corresponding components dX0[state]-dXn[state] of the correction vectors estimated by the Kalman filters; and when the set of said corresponding components are not of same sign, to formulate a component of zero value (dC[state]=0) for the stabilization vector;

when the set of said components dX0[state]-dXn[state] are of same sign, to formulate a component of non zero value for the stabilization vector, determined as a function of the value of each of said components dX0[state]-dXn[state].

The module for formulating the correction 4 is for example configured such that the non zero value of the component of the stabilisation vector dC[state] corresponds to the minimum of the set of corresponding components dX0[state]-dXn[state] of the correction vectors when said components dX0[state]-dXn[state] are all positive, and corresponds to the maximum of the set of components dX0[state]-5 dXn[state] of the correction vectors when said components dX0[state]-dXn[state] are all negative.

In the absence of satellite fault, the components dX[state] of the corrections formulated by each of the filters form overall a uniform cloud of points. In this case, dC[state] is typically chosen among one of the values of dX[state], for example the lowest.

A GPS receiver with 10 channels will be considered by way of example. If the 10 sub-filters, including that which would exclude any satellite fault, indicate a correction of altitude of at least +1 m, said correction may be taken into account in the calculation of the optimal position, because if the correction of one meter is proposed by all of the filters, that means that said correction is not due to a satellite fault but instead to a drift of the position of the inertial virtual platform.

In the presence of a satellite fault, the bias or the ramp on the pseudo-distance is going to pollute the calculation of the optimal position of all the filters except one (that which excludes the satellite fault). It is then expected that all the navigation solutions except one drift to such a point that there is a contradiction between the corrections ("dX[state]") of the N-1 filters polluted and that proposed by the filter that excludes the erroneous pseudo-distance. The solution proposed in this case is to choose not to correct the reference navigation ("dC[state]=0").

It is nevertheless possible to imagine a satellite fault of sufficiently low amplitude or a particularly poor geometry of satellite that would delay or would mask the onset of this contradiction. It is in this respect important to recall that by allocation of the pseudo-distances received, there is always a correction that is integrated among those proposed by the set of filters of the bank of filters. And the choice of the command of minimal absolute value conditioned by the coherence of the signs of the corrections makes it possible to ensure no pollution due to a satellite fault is introduced.

Moreover, the hybridization equations are linearized for each filter at its specific optimal position (via the calculation device 8 and the subtractor 9). This optimal position not being affected by the re-looping command, the hybridization is not affected by the re-looping command.

In a variant to the choice of the minimal value in absolute value, the module for formulating the correction 4 may be configured so that the non zero value of the component of the stabilization vector dC[state] corresponds to the average of the smallest P corresponding components dX0[state]-dXn[state] of the correction vectors, taken in absolute value (with P for example equal to 2).

According to yet another variant, the module for formulating the correction 4 may be configured so that the non zero value of the component of the stabilization vector dC[state] corresponds to the average of the set of components dX0[state]-dXn[state] of the correction vectors when they are of same sign.

The stabilization vector formulated according to the invention makes it possible to minimise the errors estimated for all of the filters.

This formulation of the stabilisation vector proves to be judicious in so far as it is not constrained by an FDE ("Fault Detection and Exclusion" mechanism), and where the validity of the protection rays is not constrained by a FDE. Within the scope of the invention, the virtual platform and the bank of filters will be polluted by a satellite fault, but not the filter that excludes the faulty satellite.

The stabilization vector dC thus formulated by the module 4 makes it possible to correct, with a delay 11, the PPVI inertial measurements calculated by the virtual platform, by using in a manner conventionally known in itself a subtractor 10.

Thus, the invention proposes the use of a single virtual platform stabilised by a command dC making it possible to maintain the error of the platform 2 in the hypotheses of linearity of the filters of the bank 3 which is formulated from the set of state vectors dXi of the bank of filters.

Within the scope of a closed-loop hybridization device, the hybrid output SH is re-looped at the input of the virtual platform.

Moreover, as is represented in FIG. 1, the stabilisation vector dC may be applied at the input of the set of filters of the bank of filters. In such a way, the Kalman filters adjust themselves by taking away from their estimation (correction vector dX) the formulated correction dC, and are thus maintained coherent with the virtual platform. In this way is diminished each of the components dX0[state]-dXn[state] of all the filters by the corresponding component dC[state] of the formulated correction.

According to a possible embodiment of the invention, the device 1 further comprises a bank of summers 7, each summer being positioned at the output of the bank of filters to add to each correction vector the hybrid output.

It will be noticed that the reference navigation (hybrid output SH) formulated by the device 1 serves uniquely internally. It is thus the information delivered at the output of the bank of summers 7 which supplies the optimal navigation solutions (main hybrid navigation solution "NAV INS/GPS 0" from the main Kalman filter, secondary hybrid navigation solution "NAV INS/GPS I" from the secondary Kalman filter of index i).

The architecture proposed by the invention has the following advantages:
  it only requires the integration of a single virtual platform;
  the resetting of the virtual platform is realised at the frequency of the Kalman filters;
  in the absence of satellite fault, this architecture has a performance identical to that of the architecture presented in the document EP1801539 A;
  the calculation of the stabilisation command of the platform is not constrained by a fault detection method;
  the filter not using the faulty satellite is not polluted by the fault.

The invention is not moreover limited to the hybridization device according to its first aspect, but also extends to a method of formulating a stabilization vector intended to correct inertial measurements calculated by a virtual platform of a hybridization device, characterised in that the stabilization vector is formulated component by component and in that each component dC[state] of the stabilization vector dC is formulated as a function of the set of corresponding components dX0[state]-dXn[state] of correction vectors dX0-dXn estimated by a bank of Kalman filters.

The invention claimed is:

1. A hybridization device (1) comprising:
   a virtual platform (2),
   a bank (3) of Kalman filters each estimating a correction vector (dX0-dXn), each correction vector comprising a plurality of components,
     the device delivering a hybrid output (SH) corresponding to inertial measurements (PPVI) calculated by the virtual platform (2) and corrected by a stabilization vector (dC), the stabilization vector (dC) comprising as many components as the correction vectors so that each component of the stabilization vector has a corresponding component in each of the correction vectors (dX0-dXn),
   a module for formulating the correction (4) configured so as to compute each of the components (dc[state]) of the stabilization vector (dC) as a function of the set of components (dC[state]-dXn[state]) in the correction vectors (dX0-dXn) estimated by the bank of Kalman filters.

2. The device according to claim 1, wherein the module for formulating the correction (4) is configured, for each component of the stabilization vector (dC[state]), so as:
   to analyze the sign of the set of components (dX0[state]-dXn[state]) in the correction vectors;

when the set of said components are not of same sign, to compute a component of zero value (dC[state]=0) for the stabilization vector;

when the set of said components are of same sign, to compute a component of non zero value for the stabilization vector, determined as a function of the value components in the correction vectors.

3. The device according to claim 2, wherein:

when the set components are positive, the non zero value of the component of the stabilization vector (dC[state]) is computed as the minimum of the set of components (dX0[state]-dXn[state]) in the correction vectors, when the set of said components are negative, the non-zero value of the component of the stabilization vector (dC[state]) is computed as the maximum of the set of components in the correction vectors.

4. The device according to claim 2, wherein:

P being an integer which is more or equal than 2;

the non-zero value of the component of the stabilization vector is computed as the average of the smallest P components among components (dX0[state]-dXn[state])in the correction vectors, taken in absolute value.

5. The device according to claim 1,wherein the stabilization vector is applied at the input of the set of filters of the bank of filters.

6. The device according to claim 1, wherein the hybrid output is re-looped at the input of the virtual platform.

7. The device according to claim 1, wherein the bank of Kalman filters (3) comprises a main Kalman filter (5) receiving the signal measurements emitted by n satellites, and n secondary Kalman filters (6$i$, 6$n$) each receiving the signal measurements emitted by the N satellites with the exception of one satellite.

8. The device according to claim 1, further comprising a bank of summing devices (7) positioned at the output of the bank of filters to add to each correction vector the hybrid output.

9. The Method for formulating a stabilization vector intended to correct inertial measurements calculated by a virtual platform of a hybridization device, wherein:

a bank (3) of Kalman filters each estimates a correction vector (dX0-dXn),each correction vector comprising a plurality of components, the stabilization vector comprising as many components as the correction vectors so that each component of the stabilization vector has a corresponding component in each of the correction vectors (dX0-dXn), the stabilization vector being computed component by component, and each component (dC[state]) of the stabilization vector (dC) is computed as a function of the set of components (dX0[state]-dXn[state]) in the correction vectors (dX0-dXn) estimated by the bank of Kalman filters.

* * * * *

UNITED STATES PATENT AND TRADEMARK OFFICE
CERTIFICATE OF CORRECTION

PATENT NO. : 8,781,774 B2  
APPLICATION NO. : 13/140016  
DATED : July 15, 2014  
INVENTOR(S) : Sebastien Vourc'h, Stanislas Szelewa and Thibault Lartigue Page 1 of 1

It is certified that error appears in the above-identified patent and that said Letters Patent is hereby corrected as shown below:

In the Claims

Column 6, Claim 1, line 48, delete ",each" and insert --, each--.

Column 6, Claim 1, line 59, delete "(dc[state]" and insert --(dC[state]--.

Column 6, Claim 1, line 61, delete "(dc[state]" and insert --(dX0[state]--.

Column 8, Claim 9, line 15, delete ",each" and insert --, each--.

Signed and Sealed this  
Seventeenth Day of February, 2015

Michelle K. Lee  
*Deputy Director of the United States Patent and Trademark Office*